(12) United States Patent
Furtwangler et al.

(10) Patent No.: US 10,379,915 B2
(45) Date of Patent: Aug. 13, 2019

(54) STRUCTURED LOGGING SYSTEM (71) Applicant: Home Box Office, Inc., New York, NY (US)

(72) Inventors: Nathan J. E. Furtwangler, Kirkland, WA (US); Brandon C. Furtwangler, Issaquah, WA (US); Tyler R. Furtwangler, Sammamish, WA (US)

(73) Assignee: Home Box Office, Inc., New York, NY (US)

( * ) Notice: Subject to any disclaimer, the term of this patent is extended or adjusted under 35 U.S.C. 154(b) by 172 days.

(21) Appl. No.: 14/802,625

(22) Filed: Jul. 17, 2015

(65) Prior Publication Data
US 2016/0026510 A1 Jan. 28, 2016

Related U.S. Application Data (60) Provisional application No. 62/028,371, filed on Jul. 24, 2014.

(51) Int. Cl.
*G06F 9/54* (2006.01)
*G06F 9/46* (2006.01)
*G06F 11/34* (2006.01)
*G06F 11/30* (2006.01)
*G06F 17/40* (2006.01)

(52) U.S. Cl.
CPC .............. *G06F 9/542* (2013.01); *G06F 9/466* (2013.01); *G06F 11/3072* (2013.01); *G06F 11/3438* (2013.01); *G06F 11/3452* (2013.01); *G06F 11/3476* (2013.01); *G06F 17/40* (2013.01); *G06F 2201/86* (2013.01)

(58) Field of Classification Search
None
See application file for complete search history.

(56) References Cited

U.S. PATENT DOCUMENTS

| | | | |
|---|---|---|---|
| 8,745,647 B1 | 6/2014 | Shin et al. | |
| 2003/0101287 A1* | 5/2003 | Novik | G06F 9/4428 719/318 |
| 2005/0028171 A1 | 2/2005 | Kougiouris et al. | |
| 2005/0125807 A1* | 6/2005 | Brady, Jr. | H04L 41/06 719/318 |
| 2006/0075308 A1 | 4/2006 | Haselden et al. | |
| 2007/0050846 A1 | 3/2007 | Kie et al. | |
| 2009/0043825 A1* | 2/2009 | Bourne | G06F 17/301 |
| 2010/0093316 A1* | 4/2010 | Doppler | H04M 1/72522 455/414.1 |

OTHER PUBLICATIONS

International Search Report and Written opinion from International Patent Application Serial No. PCT/US2015/041601 dated Oct. 5, 2015, 11 pages.

* cited by examiner

*Primary Examiner* — Craig C Dorais
(74) *Attorney, Agent, or Firm* — Amin, Turocy & Watson, LLP (57) ABSTRACT

The described technology is directed towards a structured logging technology in which events corresponding to program execution are received in a structured format and logged based upon filtering of those events. A log handler is associated with a filtering mechanism that determines whether each event matches filtering criteria and is thus to be logged by the log handler. The log handler provides matching logged events to an event sink, such as an analytic tool that consumes the events for analysis.

20 Claims, 10 Drawing Sheets

*Event for Video Progress* area: Playback
verbosity: ----
type: video_progress
timestamp: 5/10/15,14:31:33
data: {
    progress: 500
    |
    |
    stream ID: 7
    |
    |
}

*Event for User Achievement* type: achievement
verbosity: ~~~~
area: Program end
timestamp: 5/10/15,18:11:27
data: {
    userID = X
    deviceType = Y
    time played = 2:14:55
    level reached = 14
    }

STRUCTURED LOGGING SYSTEM

CROSS-REFERENCE TO RELATED APPLICATION

The present application claims priority to U.S. provisional patent application Ser. No. 62/028,371, filed Jul. 24, 2014.

BACKGROUND

A relatively large number of events may take place during the running of a computer program. For example, consider a video streaming application. Some of the events that may occur during a video streaming application may be related to video streaming actions, such as buffer, play, pause, stop, play (resumed) and so forth. Other types of events in the same program may be related to user navigation actions, such as interaction to change menu pages to locate video content to play, to modify settings, and so forth. Others may be system-level events.

Events may serve as sources of data that are valuable to program developers, testers, debuggers, services and so forth. These persons or services are interested in program events for testing, debugging, analytics, program improvements, hardware improvements and so on. Making such events available in a useful way is a challenge, given the large number of events and the diverse types of events.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein is directed towards handling streams of program-related events, and routing corresponding versions of those events to appropriate downstream listeners (event sinks). A log handler (or log handlers) processes event log entries that correspond to program execution. A log handler may have an associated filtering mechanism that selects only event log entries matching a specified set of one or more criterion to provide filtered event log entries. The log handler provides data corresponding to the filtered event log entries to an event sink associated with the log handler.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Described herein is a technology for managing streams of user and system driven program events, and routing transformed versions of those events to appropriate downstream listeners. Events are logged as log entries provided to a logger. In one or more implementations, the events are arranged as structured data, e.g., in a generalized data structure format that allows customized data therein, so as to maintain data that is appropriate for a type of event.

Log handlers register with the logger to receive events. Each log handler may work in conjunction with its own filtering mechanism (one or more filters) to collect only events of interest to that log handler, e.g., those that meet the log handler's associated filtering criteria.

In turn, each log handler is configured to output its collected events to a consumer of that log handler's events, referred to herein as an event sink, e.g., a server, a file system, a remote analytic tool, and so on. For example, one analytic service analyzes user navigation data, user actions, program errors and so forth, and thus is interested in those types of events. Another analytic service is interested in checking video session events, e.g., to evaluate bit rates and the like that are bandwidth and load dependent. Yet another event sink is a console/dashboard log handler that is interested in all or almost all events, for processing via development tools, debuggers, and so forth.

Although structured with respect to how events are formatted, collected and handled (e.g., filtered and sent to an event sink), the structured logging system as described herein is highly flexible. For example, the log handlers that are in use for a given application instance may be determined at runtime of that application, or alternatively, at another suitable starting point. As a more particular example, when one user logs in on an entertainment console that runs an application, that user may have a different set of event handlers from the set of event handlers of another user that later logs in on that same console.

It should be understood that any of the examples herein are non-limiting. For instance, although only certain event types are exemplified herein, including video, navigation and achievement event types, it is understood that any number of other event types may be present in a given system/for a given program. As another instance, one suitable event data format is exemplified herein, however any format is acceptable as long as understood by the event loggers and filters. As such, the technology described herein is not limited to any particular embodiments, aspects, concepts, structures, functionalities or examples described herein. Rather, any of the embodiments, aspects, concepts, structures, functionalities or examples described herein are non-limiting, and the technology may be used in various ways that provide benefits and advantages in computing and computer event handling in general.

Figure 1:
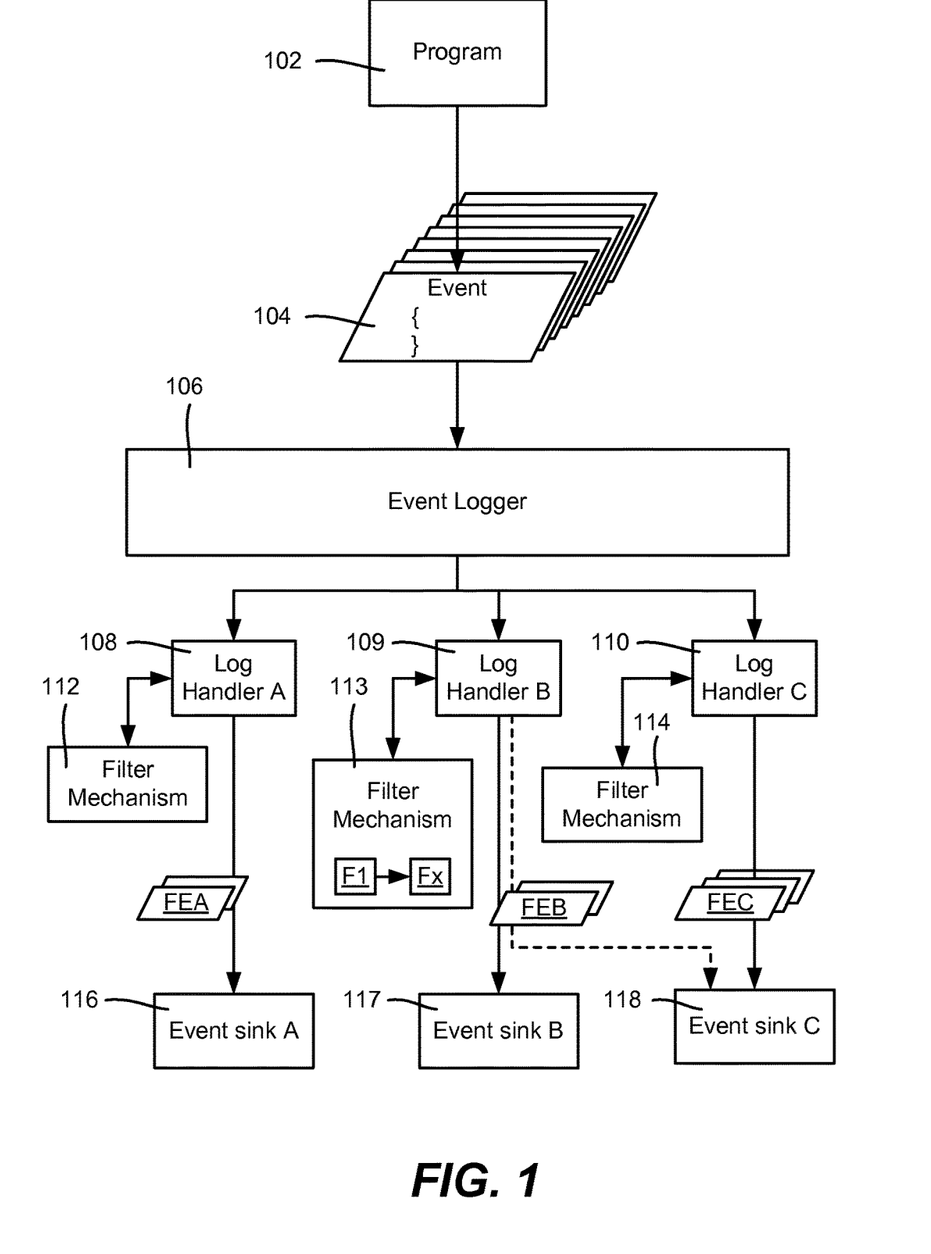
FIG. 1 is a block diagram showing an example configuration that may be used for a structured logging system, according to one or more example implementations.

FIG. 1 is a block diagram representing example components that may be used to provide a structured logging implementation. In FIG. 1, a program 102 generates events 104 as it runs. Note that events are not-limited to those generated directly by the program 102, but also include events that indirectly result from program execution, such as performance counter events, program traces, diagnostic data and so on which, for example, may be generated (e.g., by an operating system, by hardware, by middleware, by networking and so on) without needing any event generation code added to the program.

The events are obtained by an event logger 106, generally received by the event logger 106 (although a pull model may be used in which some at least some events are collected elsewhere and obtained based upon requests from the event logger). Different types of events may be obtained in different ways. For example, a user navigation event may be sent upon each navigation action, whereas other events such as performance counter events or diagnostic events may be batched and received occasionally, e.g., periodically such as once per second or whenever an event buffer is getting too full.

Structured logging supports having a collection of registered "log handlers" which are passed each log message. A logger has a filter which can be configured so that a given logger will only process certain types of structured log messages.

Thus, in FIG. 1, the event logger 106 in turn is coupled to one or more log handlers; three different log handlers 108-110 are exemplified although it is understood that one log handler up to any practical number may be present in a given scenario. The log handlers may be associated with a filter mechanism comprising one or more filters as described herein. Thus, in this example, the log handlers 108-110 have respective filter mechanisms 112-114. However, it should be noted that a log handler need not have any associated filter mechanism, in which case that log handler will collect all events. Note further that FIG. 1 shows the filter mechanism 113 having two filters F1 and Fx therein. Indeed, a pipeline of filters, conditional filters and so forth may be arranged within a given filter mechanism. A filter may be a general purpose function.

In general, the filters are separately composable entities from the log handlers. In this way, the same log handler may perform one way with one filter mechanism and a different way with another filter mechanism. However, in alternative implementations, it is feasible for a log handler to have some filtering capability built in (e.g., hardcoded), so that, for example, a "video event" log handler only handles video events, (which may be further filtered). This may be slightly more efficient than passing all obtained events to an external filter, and also may allow for more filter reuse, e.g., the same "timestamp" filter may be used for both video event filtering and navigation event filtering.

In FIG. 1, some of the events survive the filtering process associated with each log handler, referred to herein as filtered events (FEA-FEC). These filtered events are sent to (or possibly pulled by) event sinks, shown in FIG. 1 as event sinks 116-118, respectively. Note that an event logger may provide its events to multiple different event sinks, including to two or more different event sinks at different times or at the same time. For example, as represented by the dashed arrow from log hander B 109 to event sink C 118, more than one log handler can send events to the same event sink. Thus, there may be a "one-to-many" relationship between a log handler and two or more event sinks, or two or more log handlers can go to the same event sink in a "many-to-one" relationship.

Figure 2:
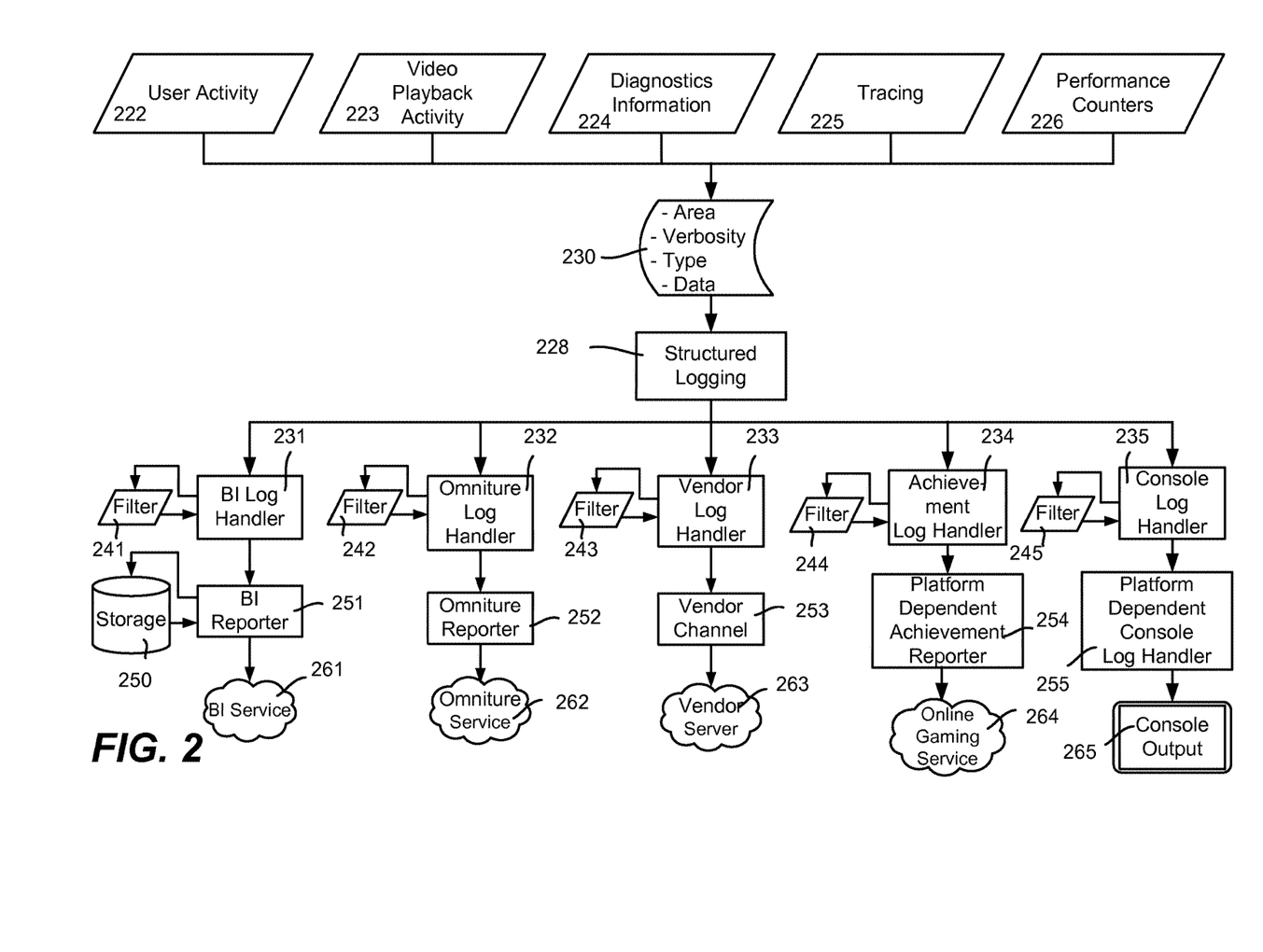
FIG. 2 is a block diagram showing an example configuration of events, log handlers having filters and event sinks, according to one or more example implementations.

FIG. 2 shows a more particular implementation, in which events related to user activity 222, video playback activity 223, diagnostics information 224, tracing 225 and performance counters 226 are provided for structured logging 228. In this example, the event data structure is represented by block 230.

Various log handlers 231-235 are shown, each with a filter mechanism 241-245 respectively. Each log handler 231-235 also includes an output mechanism 251-255, respectively, each coupled to an event sink 261-265 respectively. Note that the log handler 231 outputs to a BI reporter 251, which outputs to both storage and a BI service 261.

In general, the log handler may reformat the data as needed for any event sink to consume. This may be done with any included (e.g., hosted or coupled to) reporters, channels and platform-dependent log handlers, each of which may be considered part of their respective log handler, even if actually coupled thereto. In other words, the actual arrangement of how a logged event gets reformatted (if necessary) and communicated to an event sink is referred to as the log handler providing corresponding data to the event sink for its filtered event or set of events.

Such logs comprise a number of different types of information, including tracing data, counters, input data, navigation data and, (for a streaming video application), video playback data. Tracing generally refers to logging records that are generated for method calls. Tracing records contain the name of the method, the parameter values with which it was called, and its return value. Counters data refers to data that are collected by the application while it is running. Examples include frame rate, dropped video frames, number of hits/misses in the data cache, number of sounds the applications has played, and number of instances of a given object that have been created. Periodically or on some other basis, the log handler for this type of event may logs out statistics for this data, e.g., the min, max, average, and current value.

Input logging refers to input events, such as mouse clicks, button presses and voice commands that occur during user interaction with the application's client user interface (UI). Note that, in one or more implementations, although these input events may be handled by a platform abstraction layer (PAL) that abstracts platform-independent data for a given platform, the logging of them may occur at the platform layer. The input events may be generated from actual user interaction or from simulated interactions resulting from test automation.

Navigation logging refers to transitions between screens in the platform UI. Video playback logging refers to data generated by the playback of (e.g., a certain provider such as HBO®) video content.

Each log handler may process the (post-filtered) messages in a domain-specific way. For example, a business intelligence (BI) log handler 231 saves forwards the event data to a BI service 251. The Omniture log handler 232 translates an analytics log message into something that the Adobe® Omniture Service understands and makes a REST request of it. A console log handler 235 forwards a platform-dependent version 255, which outputs the message to a debug console 265. The achievement log handler 234 forwards to a platform-dependent version 254, which formats and notifies its respective achievement service (e.g., an online gaming service) 264.

As shown in FIG. 2, the logging technology described herein supports multiple logging listeners (referred to as "sinks"). A listener typically comprises a software component that is configured to receive some subset of the logging information generated by the platform. One listener is the Vendor's own server. Another exemplified in FIG. 2 is Omniture®, from Adobe® Systems, which is configured to listen only for navigation and video playback data.

Note that Omniture® and BI are separate log handlers although each may care about some overlapping information (in particular video playback start/end). There may be other analytics loggers, such as Conviva®. Note further that as represented in the example of FIG. 1, the BI log handler 231 may look at certain (e.g., "critical") messages (or assume they are all critical) and save them to storage 250 (disk or other storage such as cloud storage) if a network request fails or a flush opportunity does not come up before application shutdown.

The Vendor log hander 233 is responsible for forwarding Logger messages to a Vendor Channel 253 and then to a Vendor server 263, e.g., where Vendor refers to the application vendor for use by the application developers. This mechanism already exists in a non-formal way as logged messages are sent through a "logged" event to which the Vendor Channel is listening. The mechanism described herein allows for-finer grained vendor-specific filtering and does not necessarily require logged event hooks. It also allows for high-verbosity data stream to the vendor with a minimal verbosity data stream to the debug console.

One platform uses such a structured logging system in which each logging record is an object, e.g., a JavaScript Object Notation (JSON) object. The logging mechanism provides a form of cross-platform-specific debugging. Logging information is generated in the platform layers of the client stack. That is, the logging system does not collect any information from the platform abstraction layer (PAL).

In one or more implementations, a structured log entry includes at least some of the following properties:
  Area: comprising the portion of the application creating the log entry (e.g., Navigator, HttpClient, Series Pass, Watchlist, etc.)
  Verbosity: comprising a "level" of the log entry (e.g., INFO, WARNING, ERROR, DIAG)
  Type: comprising the shape of the data field (e.g., Message, Counter, Trace, Analytics, Video, Navigation, etc.)
  Data: Comprising the actual data payload Note that the event data structures are of a defined general format, with the data payload format defined by the event type. However, the technology described herein may allow for what appear to be entirely different event data structures in the same system, yet still function. For example, a video event may have an entirely different general data structure format (not just different data but its overall structure) from a navigation event data structure, as long as some mechanism of the log handler such as a pre-filter allows event log handlers to process defined event log entries in some way (at least to the extent of rejecting a type known to be irrelevant). To this end, at some highest level a uniform wrapper format or the like provides a "uniform" data structure that indicates to log-related mechanisms how each log entry event is to be handled, even if the underlying format is vastly different among log entry events.

Figure 3:
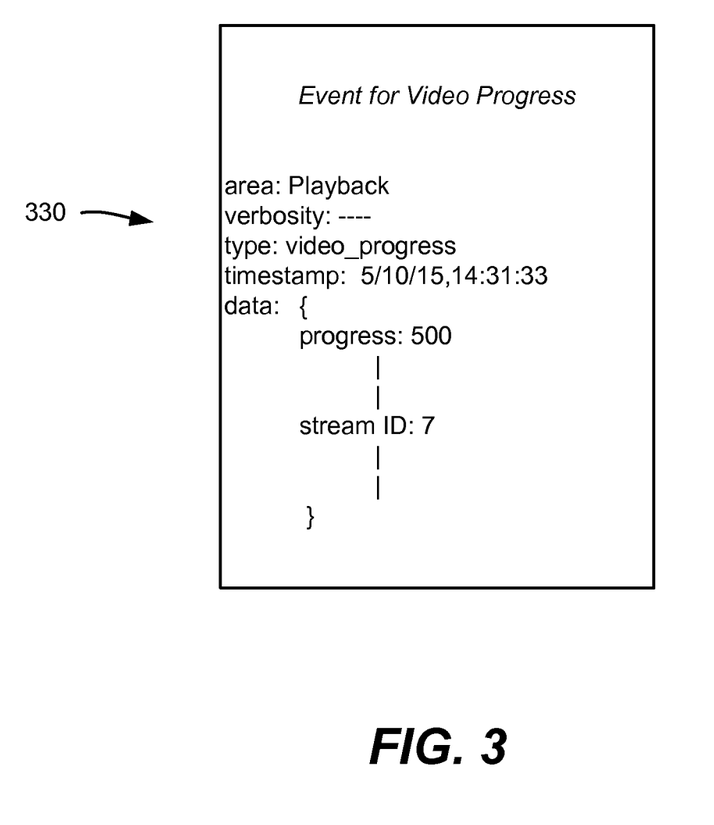
FIG. 3 is a representation of an example structured video-related event, according to one or more example implementations.

FIG. 3 shows an example data structure 330 for logging video event data. In this example, the type field indicates that the type is video progress, whereby the log handlers (and filter mechanism) can operate appropriately. Video progress in a streaming video thus may be logged as an event. Note that there may be multiple video streams, and thus the data may include a Stream identifier (ID).

Figure 4:
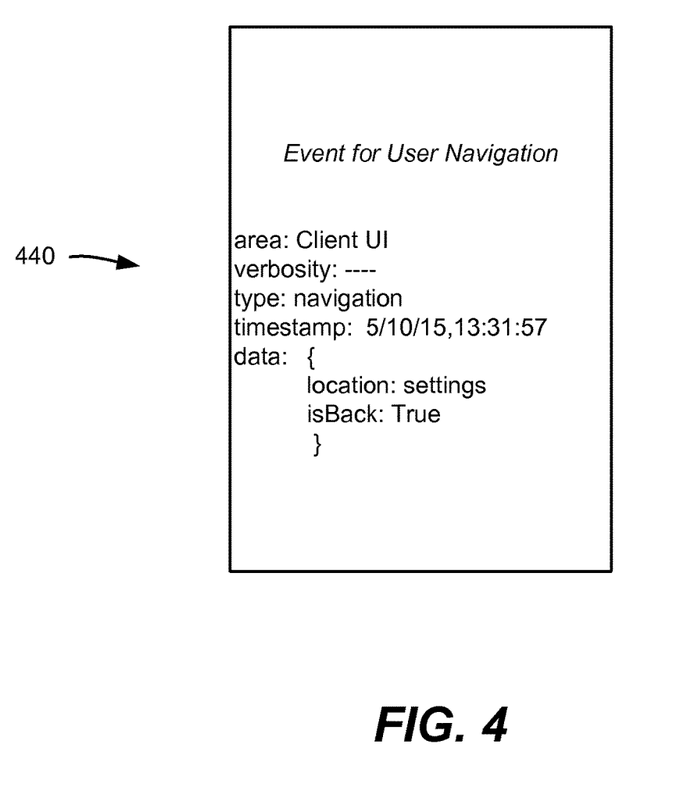
FIG. 4 is a representation of an example structured navigation-related event, according to one or more example implementations.

FIG. 4 shows an example data structure 440 for logging user navigation event data. In this example, the type field indicates that the type is navigation, such that user navigation may be logged as an event. In this example the user has navigated to a "Settings" page or the like; the IsBack data is a Boolean indicating whether the navigation occurred via a "Back" button or the like.

Figure 5:
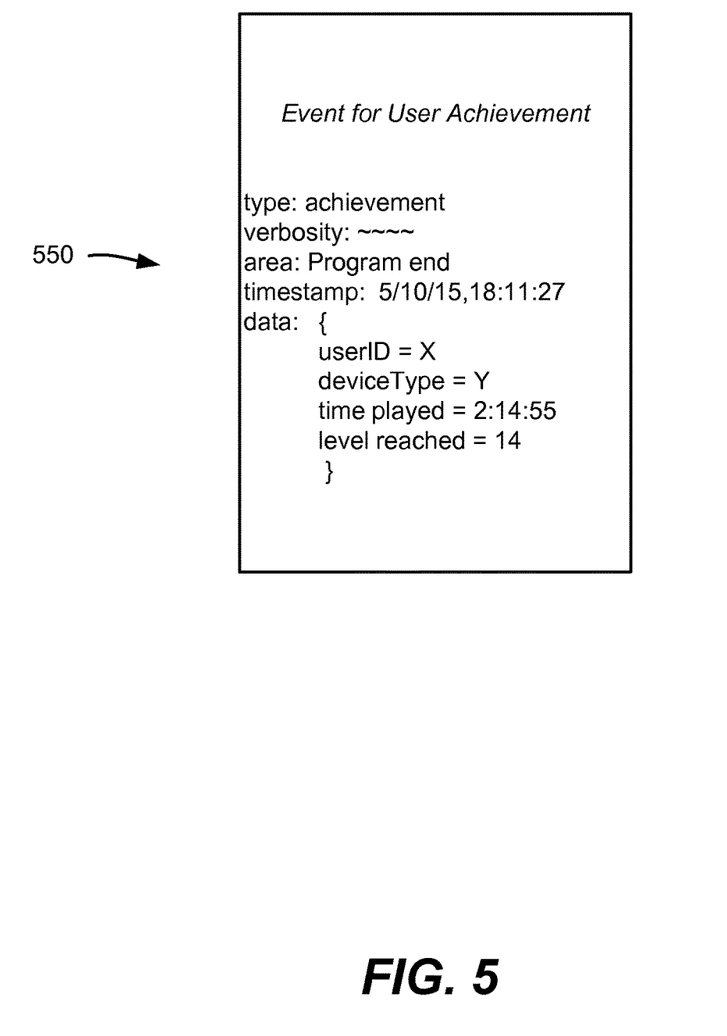
FIG. 5 is a representation of an example structured user achievement-related event, according to one or more example implementations.

FIG. 5 shows an example data structure 550 for logging achievement event data. In this example, the data includes information about the user, the type of device, the amount of time played and the level reached. A game developer is likely interested in such information for improving the game experience for its players.

Note that some of the information is the same for the entire execution of an application, and thus need not be part of the data structure. For example, the streaming video player application need not identify itself or its version in each event, as doing so may consume unnecessary space. Similarly, the user ID and device type may not change while collecting event data, and thus any larger collection of event data may simply be tagged with such information if needed by the event sink. Thus, in FIG. 5, all achievement events can be tagged with the same user and device type for a given game-playing session, for example. However, in a situation in which multiple programs may be run in parallel, different users may be playing on the same gaming console, and so forth, the event's "data" field may be used to differentiate events from different programs, different users and so on as needed.

Figure 6:
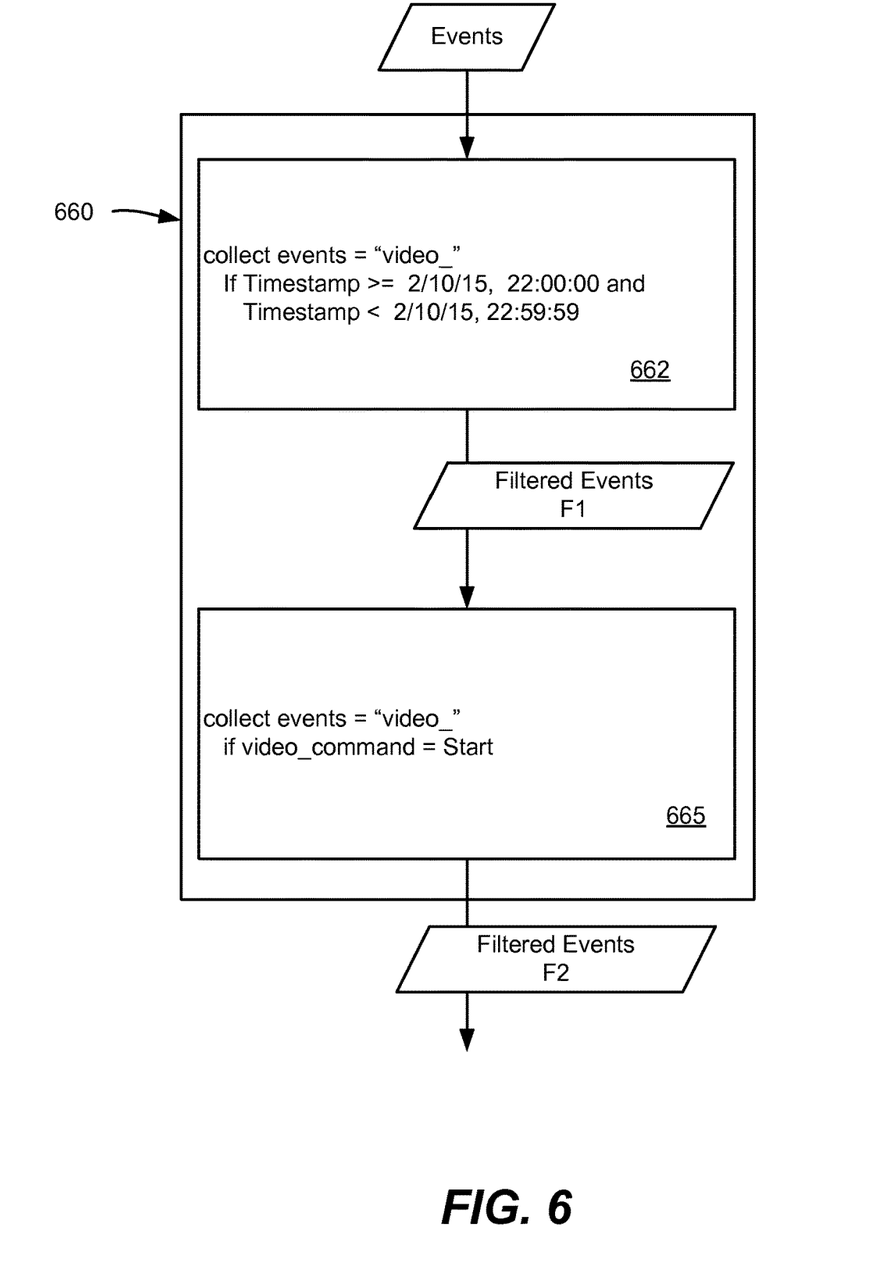
FIG. 6 is a representation of an example pipelined filtering mechanism, according to one or more example implementations.

FIG. 6 shows an example filter mechanism 660 comprising a filtering pipeline including two filters 662 and 665. In this (easily readable) example, it is seen that "video_" events (e.g., video progress, video_play, video_pause and so on) are to be collected on a specified date between specified times. This, for example, may correspond to a particular streaming television program being watched, e.g., so that analytics may later determine that some percentage of crashes came during the launch of a season premiere episode. In this example any events that meet the video_ and timestamp criteria are further filtered to only collect Start events, so that it can be determined how often a Start request was received.

Figure 7:
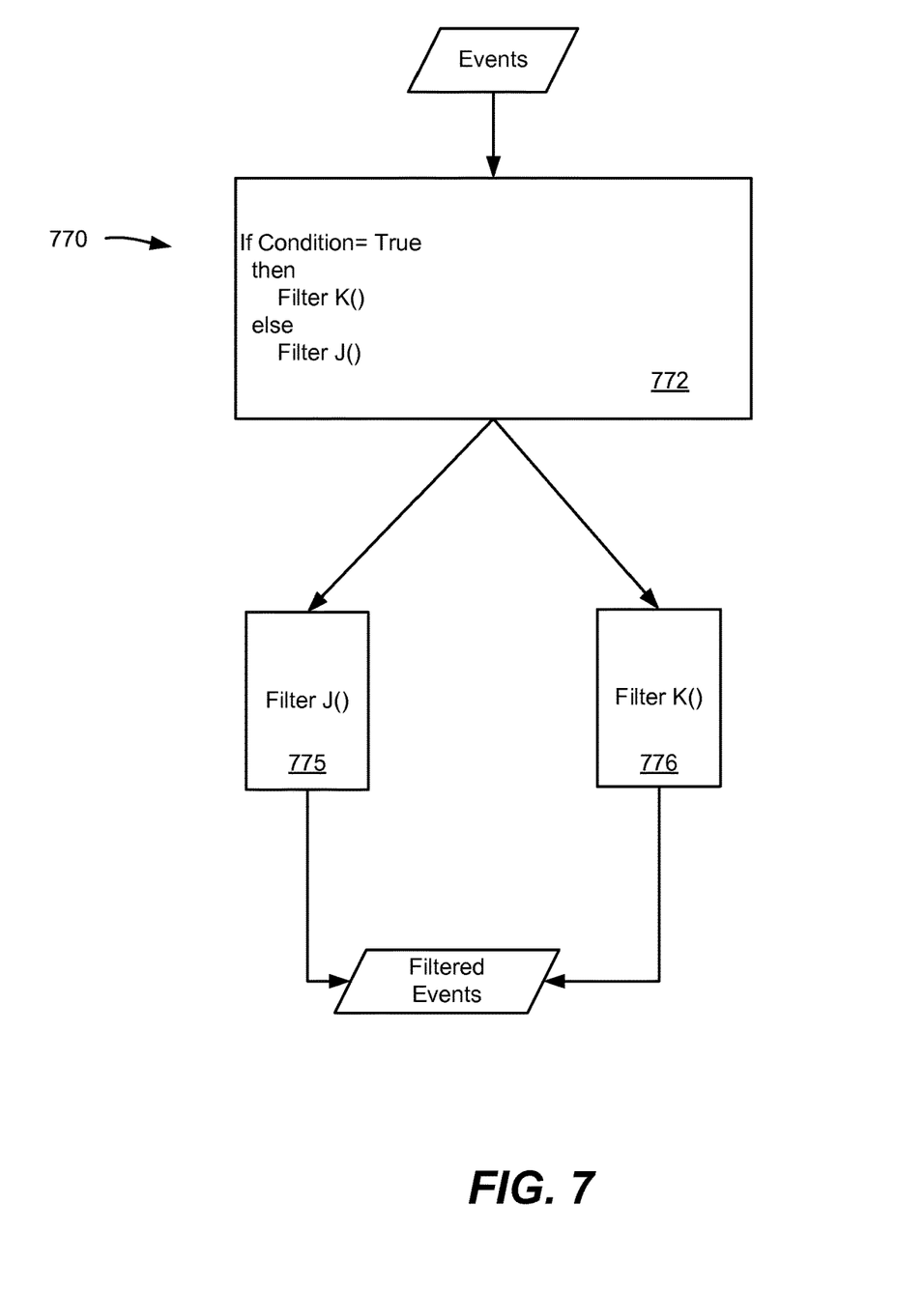
FIG. 7 is a representation of an example conditional filtering mechanism, according to one or more example implementations.

FIG. 7 shows an example filter mechanism 770 comprising a conditional filtering mechanism that uses one filter J( ) 775 or another filter K( ) 776 depending on a condition. In this example, the filters are functions that are called dependent on some condition being True or not in a first filtering stage 772. Note that mechanisms other than functions may be used for the same purpose. For example, instead of calling a function, a single filter may be a conditional filtering mechanism by containing a conditional statement as well as the logic for each condition, e.g., if condition is True then (do something to filter), else (do something different to filter). As used herein, a conditional filtering mechanism is one that filters in different ways based upon a condition, regardless of how many separate filters are available.

In one or more implementations, one or more regular expressions may be used in a filter, whether in a single filter, a conditional filter (or branch thereof), a filter function, a pipeline filtering scheme or the like. As is known, a regular expression is symbolic (text) string that describes a search pattern. This is useful for criterion (e.g., type) matching of text data, e.g., to filter video types of events from other types of events because of the "video_" search pattern present in each video event's data. In other implementations, data in the data field and other information may be given numeric identifiers, e.g., video-related events may be identified types ranging from 100-200, with each specific type having a number in that range), some navigation-type event may be identified as type 2,136, and so on so as to filter by a numeric identifier or range thereof instead of a string. Any defined identification mechanism may be used for differentiation in a given implementation as long as the entities (e.g., loggers and filters) understand the identification mechanism in use, and are configured to perform any translation needed by an event sink.

Figure 8:
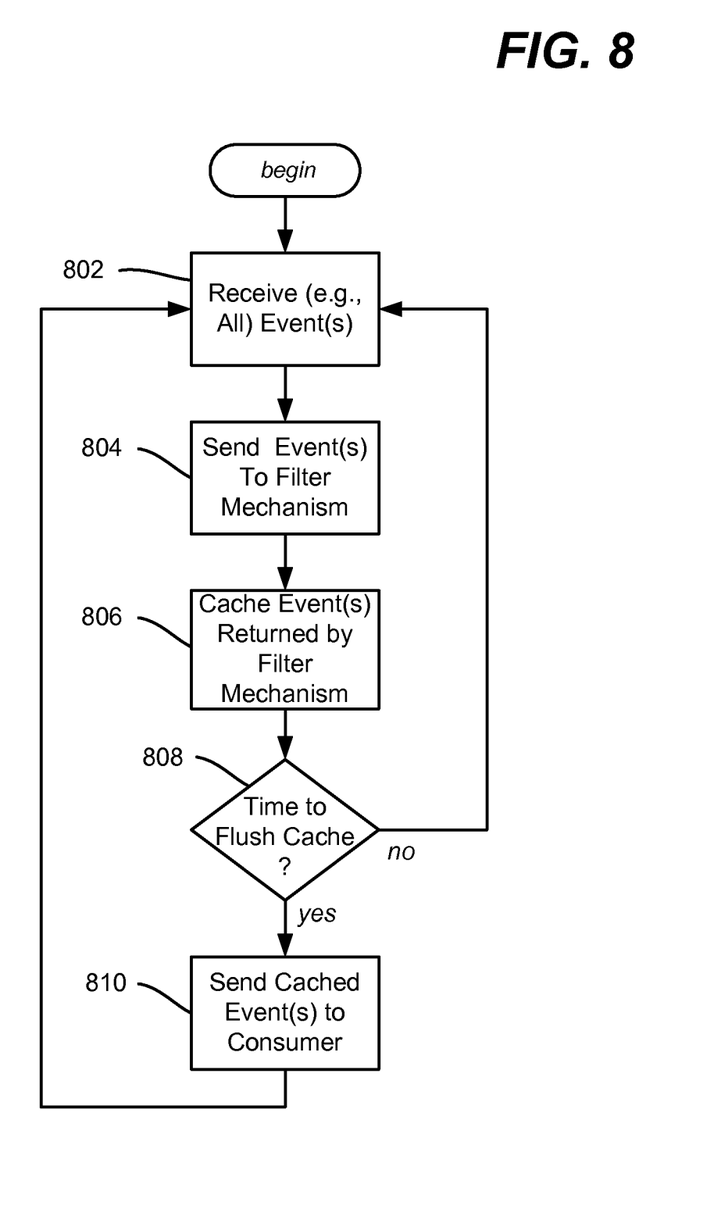
FIG. 8 is a flow diagram representing example steps for handling an event, according to one or more example implementations.

FIG. 8 is an example flow diagram showing how logging, filtering and sending event data generally works with respect to a log handler. Step 802 represents receiving the events generated in conjunction with a running program. This may be as they are generated, as they are batched and sent and so forth. Step 804 sends the received events to a filter mechanism.

Step 806 represents keeping (caching) the events that met the filtering criteria and were thus returned to the log handler (the associated filtering mechanism may directly cache such events on the log handler's behalf). Step 808 repeats the process until it is time to flush the cache, whether because of time conditions (e.g., every minute) and/or size (e.g., the cache is eighty percent full) conditions. Step 810 flushes the cache as appropriate.

Figure 9:
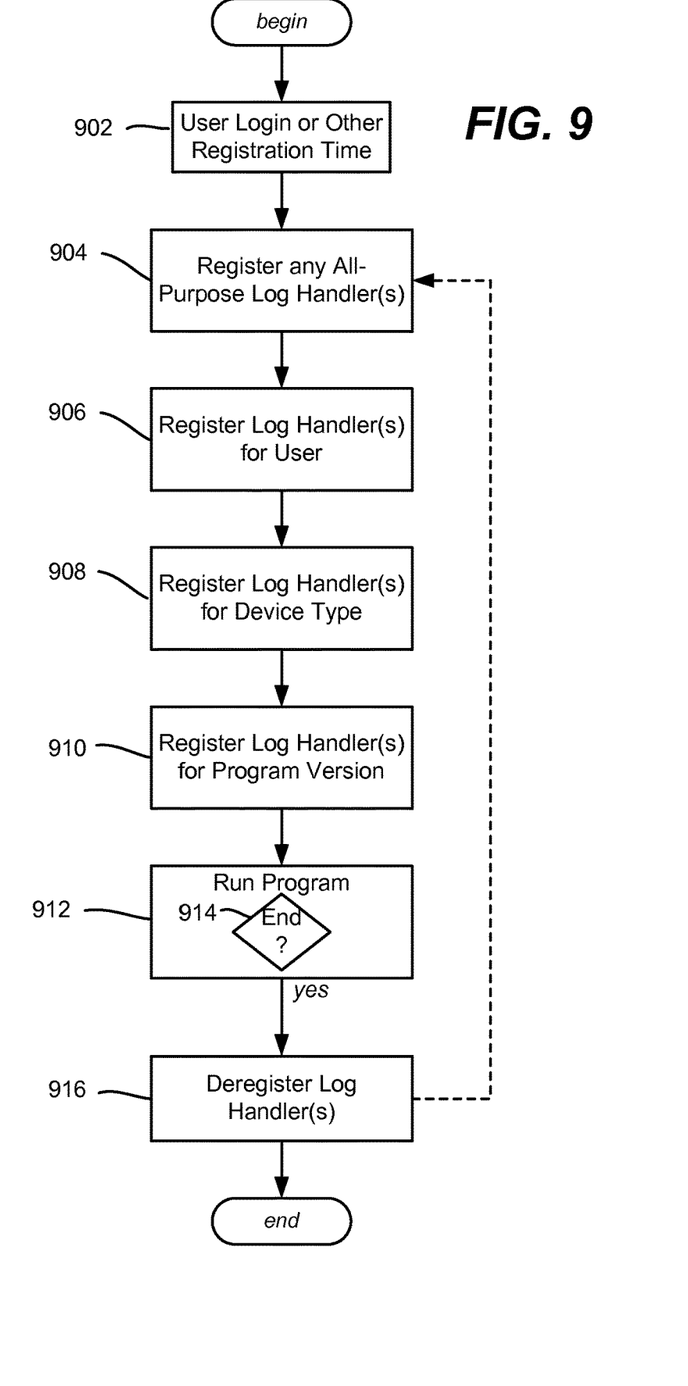
FIG. 9 is a flow diagram representing example steps for registering relevant log handlers, according to one or more example implementations.

FIG. 9 is flow diagram representing example steps that may be taken to collect data from log handlers that are relevant to a current logging scenario. As one example of relevance, consider that A/B testing is using two groups of users running different program versions. One set of log handlers may be applicable for the A group, while another set is applicable for the B group. As another example, a user experiencing a rare bug may have more log handlers or ones with less restrictive filtering so as to collect more data than is collected for other users.

To this end, a server may determine which log handlers to register at an appropriate time, such as application runtime. Note that a more appropriate time for certain devices may be at user login time, because an application may continue running while different users log in and out. Step 902 represents reaching the appropriate registration time.

Step 904 represents registering any all-purpose log handlers, that is, those that are independent of any criterion (such as user, group, program version) as to whether they should be used or not. For example, a program error log handler may be run to log program error events regardless of any other events being logged. There may not be any all-purpose log handlers, however.

Step 906 represents registering any per-user log handlers, which may be per group of users. Step 908 registers any that are specific to a device. For example, a mobile phone of a particular vendor may be experiencing issues that a gaming console is not experiencing, whereby log handlers may be registered to capture additional information from those types of devices.

Step 910 represents registering any program version-dependent log handlers, such as for A/B testing as set forth above. As can be readily understood, there may be different sets of handlers for any given scenario, e.g., weekend versus weekday handlers, temporary handlers that are registered for the first month following a new program launch, and so on. As can be readily appreciated, some of the desired data may be collected by using different sets of handlers for a scenario, while other desired data may be collected by varying the filtering criteria of an existing handler.

Step 912 represents running the program, which causes the registered log handler(s) to collect the appropriate log event entries. This continues until step 914, which represents the end of the program, (or the logging in of a different user), at which time step 916 deregisters the registered log handlers. If the program continues to run with a different user, step 916 returns to step 904. As can be appreciated, if a new user logs in, only those handlers that are user-dependent need be deregistered for the previous user at step 916 and reregistered for the new user at step 906.

With respect to other scenarios, logging configuration provides for configuring the logging system so that only certain areas of a platform generate logging data. In one or more implementations, one such platform is organized into Namespaces, Subnamespaces, and Types; for example, "UI.View.Activated." Using regular expressions and this namespace convention, a developer or other user can specify that, for example, everything under "UI" (Namespace) is to be logged, or instead, that everything under "UI.View" (Subnamespace) is to be logged. The logging configuration may be specified in a file, which is then specified when the client application is built. Therefore, the configuration is determined at build time; however alternatives may be implemented (e.g., by changing the file or its data to facilitate runtime modification when the client application is launched).

As can be seen, in one or more implementations, the technology described herein provides for decoupling of the source of events/data from the consumers of the events/data, and allows 1 to N and N to 1 reporting. The technology reduces the frequency of redundant event reporting, which improves application responsiveness. The technology allows new log handlers to be added later in application development or in newer versions of the application without affecting the sources of event data. The technology enables shared cross-platform event handling while still supporting domain-specific platform-dependent event handling. The technology enables abstraction of certain platform-dependent event types (e.g., achievements/trophies on game consoles). The technology facilitates proxy logging/reporting to remote machines, and enables configurable logging information (by toggling log handlers on or off; emitters can be toggled on or off to optimize for performance versus verbosity.

One or more aspects are directed towards a log handler set comprising one or more log handlers, in which each log handler is configured to process event log entries that correspond to program execution. A first log handler of the set has an associated filtering mechanism that selects only event log entries of a desired type to provide filtered event log entries. The first log handler is configured to provide data corresponding to the filtered event log entries to an event sink associated with the first log handler. The first log handler may reformat the filtered event log entries for sending to the event sink.

The filtering mechanism may include at least one regular expression for string matching, may include at least two filters in a pipeline configuration, and/or may include a conditional filter. The event log entries may include streaming video playback activity events, user activity events, diagnostics information, tracing data, performance counter data and/or user achievement events.

The first log handler may be registered to process log event entries based upon a program version. The first log handler may be registered to process log event entries based upon a device type. The first log handler may be registered to process log event entries based upon a user or group identifier. The first log handler may be deregistered upon a logout operation.

The log entries may be uniform log entries with respect to a general data structure, and the data structure may comprise type information and a data payload, in which data in the data payload is dependent on the type information. The general data structure further may include an area field, a verbosity field, and/or a timestamp field.

One or more aspects are directed towards receiving structured events at a log handler, in which the structured events are based upon program execution, and filtering the events based upon type information in each event to obtain only filtered events desired by the log handler. Data corresponding to the filtered events is output to at least one event sink. The data corresponding to the filtered events to at least one event sink may be cached in a cache, which is flushed upon meeting at least one cache flushing criterion.

The event handler may be registered to obtain the structured events based upon a user or group identity, a program version or a device type. The events may be filtered by providing the events to a filtering mechanism comprising a regular expression-based filter, a conditional filter and/or a filter pipeline.

One or more aspects are directed towards registering a first log handler and a second log handler to receive events from a plurality of event sources corresponding to program execution. Events are received at the first log handler, and filtered via a first filtering mechanism associated with the first log handler into a first set of filtered events. Events are received at the second log handler, and filtered via a second filtering mechanism associated with the second log handler into a second set of filtered events. A first set of data corresponding to the first set of events is output to a first event sink, and a second set of data corresponding to the second set of events is output to a second event sink.

Filtering the events via the first filtering mechanism may comprise filtering based upon information in a type field within each event.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 10 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 10:
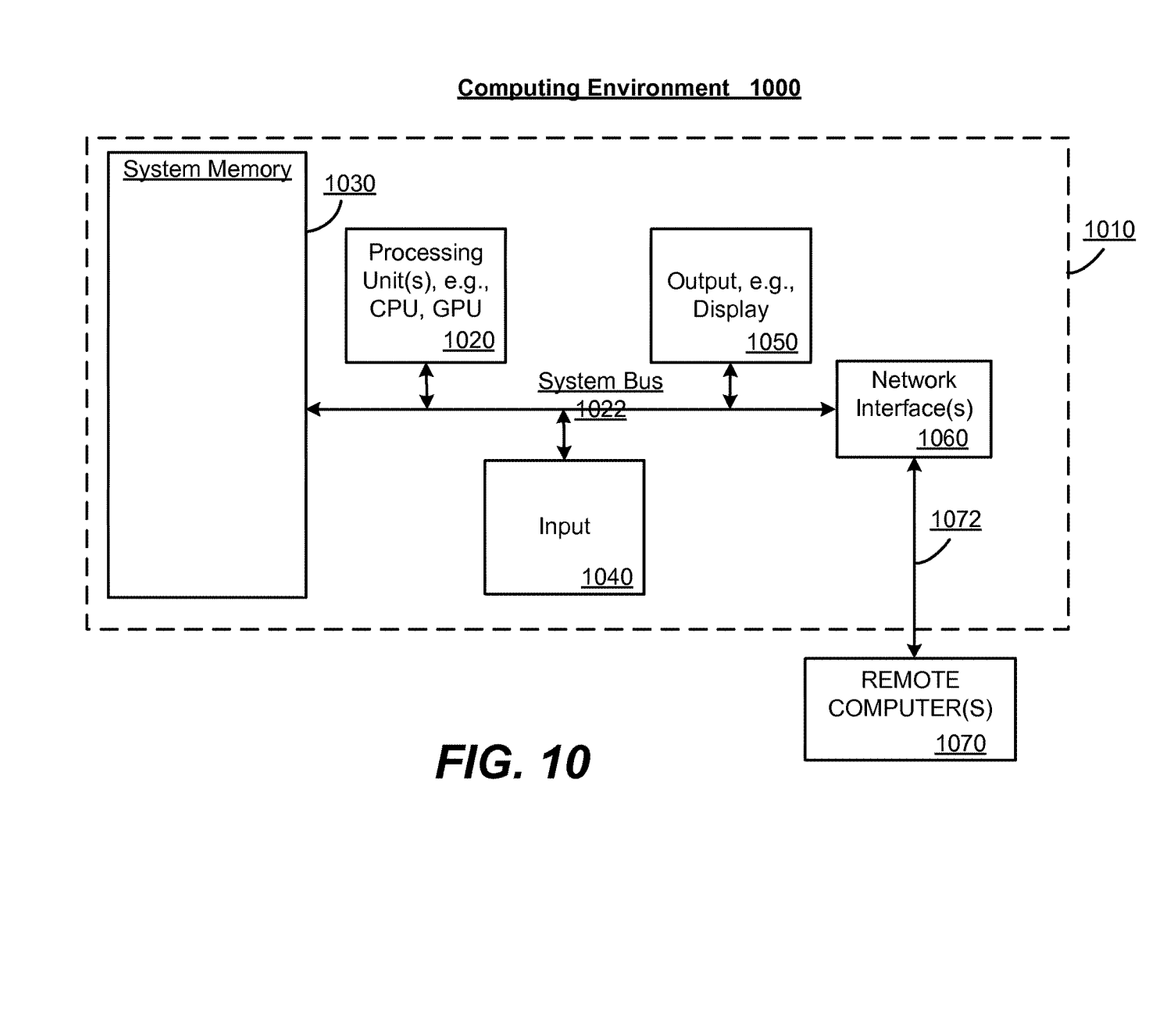
FIG. 10 is a block diagram representing an example computing environment into which aspects of the subject matter described herein may be incorporated.

FIG. 10 thus illustrates an example of a suitable computing system environment 1000 in which one or aspects of the embodiments described herein can be implemented, although as made clear above, the computing system environment 1000 is only one example of a suitable computing environment and is not intended to suggest any limitation as to scope of use or functionality. In addition, the computing system environment 1000 is not intended to be interpreted as having any dependency relating to any one or combination of components illustrated in the example computing system environment 1000.

With reference to FIG. 10, an example device for implementing one or more embodiments includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 typically includes a variety of machine/computer-readable media and can be any available media that can be accessed by computer 1010. The system memory 1030 may include computer storage media in the form of volatile and/or nonvolatile memory such as read only memory (ROM) and/or random access memory (RAM), and hard drive media, optical storage media, flash media, and so forth. By way of example, and not limitation, system memory 1030 may also include an operating system, application programs, other program modules, and program data.

A user can enter commands and information into the computer 1010 through one or more input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such as a local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A system, comprising:
an event logger that receives event log entries that correspond to events generated during an execution of a program; and
a server component that:
determines a quantity of log handlers to employ for the program based on a determination of a rarity of a bug in the program, and
selects one or more log handlers from a set of log handlers to meet the quantity of log handlers, each log handler configured to process event log entries that correspond to program execution, wherein the one or more log handlers comprise a first log handler having an associated filtering mechanism that selects only event log entries matching a specified set of one or more criterion to provide filtered event log entries, and first log handler data configured to provide data corresponding to the filtered event log entries to an event sink associated with the first log handler, wherein the event log entries comprise event information represented via a defined data structure comprising two or more fields, and wherein the one or more log handlers are selected from the set of log handlers at runtime based on a classification of a device that is utilized to execute the program.

2. The system of claim 1, wherein the filtering mechanism includes at least one regular expression for string matching.

3. The system of claim 1, wherein the filtering mechanism includes at least two filters in a pipeline configuration.

4. The system of claim 1, wherein the filtering mechanism includes a conditional filter.

5. The system of claim 1, wherein the event log entries include streaming video playback activity events.

6. The system of claim 1, wherein the event log entries include at least one of: user activity events, diagnostics information, tracing data or performance counter data.

7. The system of claim 1, wherein the event log entries include user achievement events related to a gaming service.

8. The system of claim 1, wherein the first log handler reformats the log entries to provide the data corresponding to the filtered event log entries to the event sink.

9. The system of claim 1, wherein the one or more log handlers are selected at runtime further based upon a version of the program.

10. The system of claim 7, wherein the user achievement events comprise information indicative of at least one of a time period for which a game has been played, a level in the game reached by a player, game statistics, or an award won by a player in a game.

11. The system of claim 1, wherein the one or more log handlers are selected at runtime further based upon defined timing data.

12. The system of claim 1, wherein the classification of the device comprises a vendor identity of a vendor of the device.

13. The system of claim 1, wherein the fields comprise a type information field and a data payload, in which data in the data payload is dependent on the type information.

14. The system of claim 13, wherein the fields further include at least one of: an area field indicative of at least a portion of an application that creates an event log entry of the event log entries, or a verbosity field indicative of a priority level of the log entry.

15. A method implemented at least in part on at least one machine, comprising:
receiving structured events that are generated during an execution of a program and comprise event log data represented via a defined data structure that comprises a first field indicative of a type of event and a second field indicative of the event data payload;
determining a quantity of log handlers to employ for the program based on a determination of a rarity of a bug in the program;
selecting one or more log handlers from a set of log handlers at runtime of the program to meet the quantity of log handlers and based on type data indicative of a type of a device that executes the program, wherein the one or more log handlers are employable to process the structured events;
employing the one or more log handlers to facilitate filtering the events based upon type information within the first field to obtain only filtered events specified by the one or more log handlers; and
outputting data corresponding to the filtered events to at least one event sink.

16. The method of claim 15, wherein the selecting comprises selecting, at runtime, the one or more log handlers further based upon program data indicative of a version of the program.

17. The method of claim 15, wherein the employing the one or more log handlers comprises employing a filtering mechanism comprising a regular expression-based filter, a conditional filter or a filter pipeline, or any combination of a regular expression-based filter, a conditional filter or a filter pipeline to filter the structured events.

18. The method of claim 15, wherein outputting data corresponding to the filtered events to at least one event sink comprises caching data in a cache, and flushing the cache upon meeting at least one cache flushing criterion.

19. One or more machine-readable media having machine-executable instructions, which when executed perform steps, comprising:
receiving structured events that are generated during an execution of a program and comprise event log data represented via a defined data structure that comprises a first field indicative of a type of event and a second field indicative of the event data payload;
determining a quantity of log handlers to employ for the program based on a determination of a rarity of a bug in the program;
selecting one or more log handlers from a set of log handlers at runtime of the program to meet the quantity of log handlers and based on type data indicative of a type of a device that executes the program, wherein the one or more log handlers are employable to process the structured events;
employing the one or more log handlers to facilitate filtering the events based upon type information within the first field to obtain only filtered events specified by the one or more log handlers; and
outputting data corresponding to the filtered events to at least one event sink.

20. The one or more machine-readable media of claim 19, wherein the selecting comprises selecting, at runtime, the one or more log handlers further based upon program data indicative of a version of the program.

* * * * *